United States Patent [19]

Ball

[11] Patent Number: 4,667,063

[45] Date of Patent: May 19, 1987

[54] ELECTRICAL CABLE HAVING AT LEAST ITS LEADING END PARTIALLY PREPARED FOR JOINTING PRIOR TO LAYING

[75] Inventor: Edmund H. Ball, Southampton, England

[73] Assignee: Pirelli General plc, London, England

[21] Appl. No.: 815,882

[22] Filed: Jan. 3, 1986

[30] Foreign Application Priority Data

Jan. 23, 1985 [GB] United Kingdom ............... 8501670

[51] Int. Cl.$^4$ ......................................... H02G 15/068
[52] U.S. Cl. .................................... 174/73 R; 174/10
[58] Field of Search ............ 174/10, 19, 73 R, 73 SC, 174/74 R, 74 A, 75 R, 79, 88 C

*Primary Examiner*—Laramie E. Askin
*Attorney, Agent, or Firm*—Brooks Haidt Haffner & Delahunty

[57] ABSTRACT

A cable length of the type comprising a conductor, polymeric insulation 3 over the conductor, a semiconducting screen 4 over the polymeric insulation, a fault carrying screen 5 over the semiconducting screen, and a protective sheath 6 over the semiconducting screen has at least the leading end thereof partially prepared for jointing prior to laying of the cable. At the leading and or each end the cable is stripped back over successive increasing lengths 7, 8, 9 to its polymeric insulation 3, its semiconducting screen 4 and its fault carrying screen 5. A semiconducting sleeve 13 fits over the protective sheath 6, extends over the stripped lengths of fault carrying screen 5 and semiconducting screen 4 and abuts the end portion of the latter. A clamp 12 disposed within the sleeve 13 terminates the fault carrying screen 5 and a sleeve 19 of polymeric insulation is provided on the stripped length of polymeric insulation 3. The sleeves 13 and 19 have the same outside diameter and thus the cable end has a generally cylindrical form with an outside diameter such as the outside diameter of the cable. This facilitates laying of the cable when the end is the leading end and has to be pulled through a trench. The cable as partially prepared is wound on a drum.

9 Claims, 2 Drawing Figures

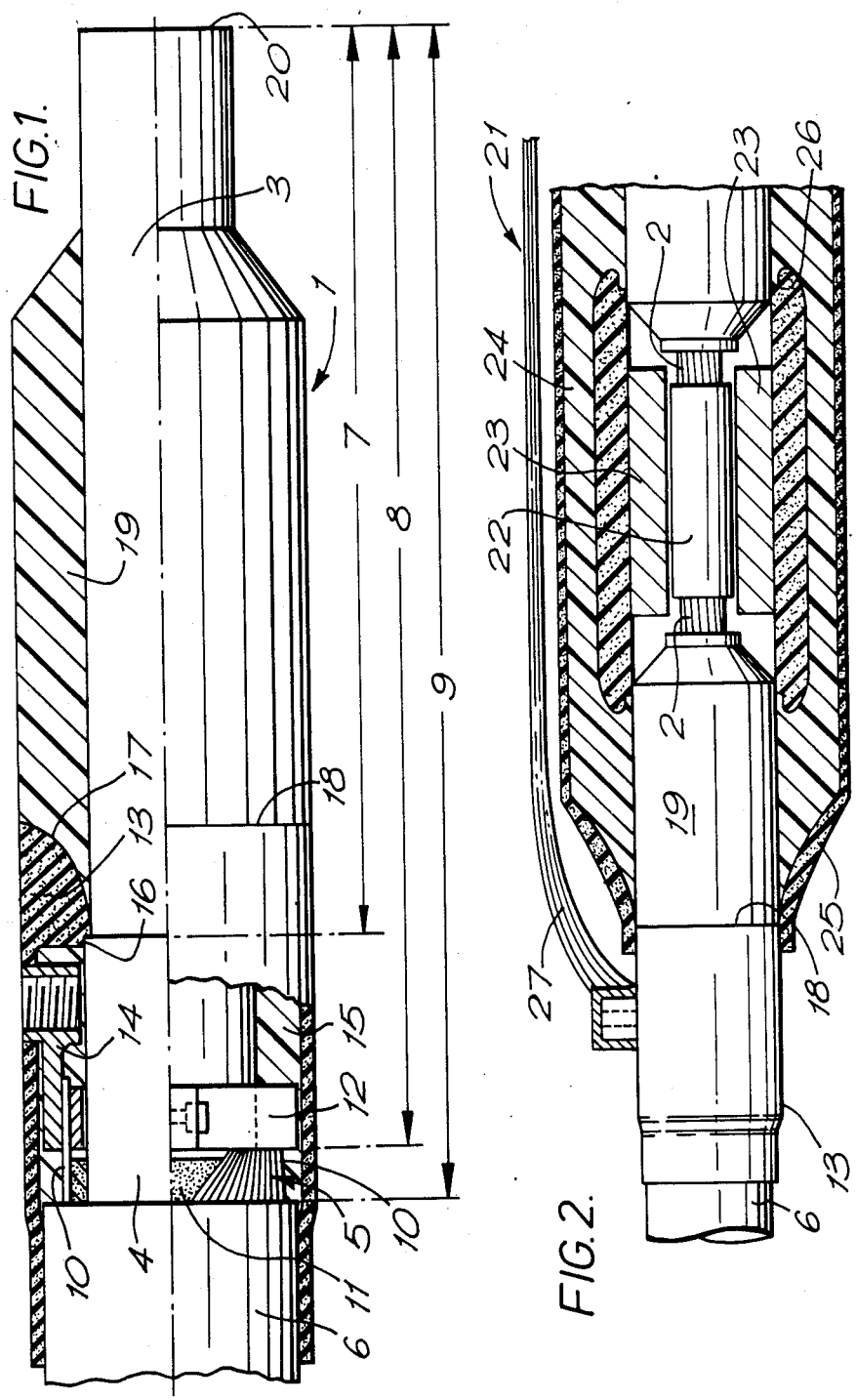

ELECTRICAL CABLE HAVING AT LEAST ITS LEADING END PARTIALLY PREPARED FOR JOINTING PRIOR TO LAYING

This invention relates to the jointing of electric cables, particularly electric cables of the type comprising a conductor, polymeric insulation over the conductor, a semiconducting screen over the polymeric insulation, a fault carrying screen over the semiconducting screen, and a protective sheath over the fault carrying screen.

Present practice is to prepare the cable ends for jointing in the field. This involves a considerable amount of skill and time and usually requires the construction of joint bays in which the jointer can work.

An object of the present invention is to reduce the amount of cable end preparation required in the field, thus also reducing the time and skill required to make the joint in the field and making possible the elimination of the need to construct joint bays.

With this object in mind, in accordance with the present invention, at least some of the cable end preparation is carried out before the cable is laid, and preferably in the factory where the cable is made. The invention includes a length of cable of the type referred to above on a drum and having at least the leading end thereof at least partially prepared for jointing to a like cable, said cable end having respective means terminating the fault carrying screen, the semiconducting screen and the polymeric insulation, which means are adapted to enable connection of these elements of the cable to the corresponding elements of a like cable, said cable end including the respective terminating means thereon having a generally cylindrical form with an outside diameter substantially the same as the outside diameter of the cable to facilitate laying of the cable.

In a presently preferred embodiment of the invention, described hereinafter, said cable at said or each end is stripped back over successively increasing lengths to its polymeric insulation, its semiconducting screen and its fault carrying screen; a semiconducting sleeve fits over the protective sheath, extends over the stripped lengths of fault carrying screen and semiconducting screen and abuts the end portion of the semiconducting screen; a clamping means disposed within said semiconducting sleeve terminates the fault carrying screen; and a sleeve of polymeric insulation is provided on said stripped length of polymeric insulation; said sleeves having the same, or substantially the same, outside diameter.

Advantageously, the sleeve of polymeric insulation is moulded on said stripped length of polymeric insulation.

A temporary protective sleeve is preferably fitted over the cable end to protect the latter during transport of the cable to the field site and also, when the end is the leading end of the cable length, during pulling of the cable into a trench therefor.

In order than the invention may be well understood, the presently preferred embodiment referred to above, will now be described by way of example only, reference being had to the accompanying drawings, in which:

FIG. 1 is a part fragmentary and part axial cross-sectional view of the leading end of a length of cable; and FIG. 2 is a part fragmentary and part axial cross-sectional view of a cable joint made with the leading cable end shown in Figure 1.

In FIG. 1, there is shown the leading end 1 of a length of cable which is coiled on a drum (not shown). The cable is a high voltage cable, for example 33 kV, and comprises polymeric (for example cross-linked polyethylene) insulation 3 over its conductor 2 (see FIG. 2), a semiconducting screen 4 over the polymeric insulation 3, a fault carrying screen 5 over the semiconducting screen 4, and a protective, plastic (for example p.v.c.) sheath 6 over the fault carrying screen 5. AT the leading end of the cable—and also preferably at the trailing end thereof—the cable end is stripped back over successively increasing lengths, to its polymeric insulation 3, its semiconducting screen and its fault carrying screen 4 as indicated by distances 7,8 and 9.

The fault carrying screen 5 comprises tapes or, as illustrated, wires 10 laid over a bedding 11 on the semiconducting screen 4 and is terminated by means of a circumferentially adjustable clamp 12 which is clamped over the ends of the wires 10. A semiconducting sleeve 13 formed as a moulding of a semiconducting rubber is fitted to the cable end 1. The sleeve 13 fits over the plastic sheath 6, extends over the stripped lengths of fault carrying screen 5 and semiconducting screen 4, and abuts the end portion of the semiconducting screen 4 to form a termination of the latter. The clamp 12 is disposed within the sleeve 13 and has a connecting boss 14 which is located within an aperture in the sleeve. A flexible resin 15 is introduced into the space remaining inside the sleeve 13 through a hole (not shown) in the wall thereof to exclude water penetration and to provide mechanical strength. The sleeve 13 is provided with an internal counter-bore 16 which receives the end portion of semiconducting screen 4 in abutting relationship. The internal surface 17 of the sleeve flares outwardly from the radial face of the counterbore 16 to the end 18 of the sleeve 13 for controlling electrical stress distribution at this location. A sleeve 19 of polymeric (for example EPDM) insulation is provided on the stripped length of polymeric insulation. This polymeric sleeve 19 is moulded directly onto the cable insulation 3 and hence becomes bonded to it with no voids therebetween. Because of the moulding procedure, the end face of the sleeve 19 adjacent the surface 17 of the sleeve 13 conforms exactly with the surface 17. The opposite end face may be frusto-conical as shown and terminates short of the end face 20 of the cable leaving a short protruding length of core 2 covered with polymeric insulation 3.

The sleeves 13 and 19 have the same, or substantially the same, outside diameter and the cable end 1 has a generally cylindrical form with an outside diameter substantially the same as the outside diameter of the cable—this may be the outside diameter of the plastic sheath 6 or a covering (not shown) over the sheath 6.

The configuration of the cable end 1, which presents substantially the same form as the rest of the cable and has no radially outwardly extending projections, together with the relatively short length of the cable end enables the cable to be pulled into a trench in which it is to be laid without substantial risk of the cable end jamming on either horizontally disposed rollers in the trench or vertically disposed rollers located at bends in the trench as commonly used. To protect the cable end during such a pulling operation and also during storage of the cable on the drum and transport thereof to the field site, a temporary rubber sleeve (not shown) packed with silicone grease may be fitted over the cable end.

Referring now to FIG. 2, the connection of the cable end 1 to a like cable end in the field will be described. Only a minor amount of further preparation to the cable ends is required. Any temporary protective sleeves provided on the cable ends must be removed and the conductors 2 protruding from the sleeves 19 bared of their polymeric insulation 3 to enable the conductors to be joined. Prior to joining the conductors, a tubular insulation bush 21 is passed over one of the cable ends. Thereafter, the conductors are joined, for example using a connecting ferrule 22, heat transfer element 23 preferably disposed around the connection of the conductors, and the bush 21 located over the connection. The bush 21 comprises a plastic insulating body 24 which is provided with an integral outer semiconducitve layer 25 and also internally with an integral field deflector 26 made of a semiconductive material. When located in position, as illustrated in FIG. 2, the bush body 24 tightly contacts the insulation sleeve 19 of each cable end, and the outer layer 25 interconnects the semiconducting sleeves 13 of the cable ends. As will be noted from FIG. 2, the outer layer 25 overlaps the exterior of the sleeve 13 to provide a tolerance for the location of the bush 21. Furthermore, the layer 25 flares outwardly from the end 18 of the sleeve 13 for controlling stress distribution, the inner surface of the layer 25 providing a general continuation of the surface 17 of the sleeve 13 whilst allowing some tolerance in the relative axial positions of the bush 21 and the sleeve 13.

The fault carrying screens 5 of the two cable ends are interconnected by means of a bridging braid 27 connected at each end to the connecting boss 14 of the clamp 12 terminating the fault carrying screens 5 of the respective cable ends. A metallic mesh (not shown) may also extend about the joint and be connected to the bosses 14.

As will be appreciated, the embodiment provides a cable having a cable end which is partially prepared for jointing to a like cable. The cable end has means formed respectively by the clamp 12, the semiconducting sleeve 13 and the polymeric insulation sleeve 19 which terminate the fault carrying screen 5, the semiconducting screen 4 and the polymeric insulation 3, and which enables rapid connection of these elements of the cable to the corresponding elements of a like cable. Preferably, of course, the end of the like cable would be similarly partially prepared for jointing, but this need not always be the case. By moulding the sleeve 19 directly onto the cable insulation 3, no voids between these parts which could give rise to weakness under electrical stress are produced. Furthermore, since the fitting of the semiconducting sleeve 13 takes place in the factory, more control over the screen interface is possible than is the case where the cable end is prepared in the field.

It will be appreciated that since time for jointing in the field is much reduced by pre-preparation of the cable ends, as described above, and the outside diameter of the finished joint will not be substantially greater than that of the cables being jointed, it is normally not necessary to construct a joint bay for the jointing work. This provides greater flexibility in the situation of cable joints along a given route and allows greater tolerance for drum lengths.

I claim:

1. A length of cable of the type comprising a conductor, polymeric insulation over the conductor, a semiconducting screen over the polymeric insulation, a fault carrying screen over the semiconducting screen, and a protective sheath over the fault carrying screen, which length of cable is wound on a drum and has at least the leading end thereof at least partially prepared for jointing to a like cable at least said leading end having respective means terminating the fault carrying screen, the semiconducting screen and the polymeric insulation, which means are adapted to enable connection of these elements of the cable to the corresponding elements of a like cable, at least said leading end including the respective terminating means thereon having a generally cylindrical form with an outside diameter substantially the same as the outside diameter of the cable to facilitate laying of the cable.

2. A length of cable as claimed in claim 1, wherein said cable at at least said leading end is stripped back over successively increasing lengths to its polymeric insulation, its semiconducting screen and its fault carrying screen; a semiconducting sleeve fits over the protective sheath, extends over the stripped lengths of fault carrying screen and semiconducting screen and abuts the end portion of the semiconducting screen; a clamping means disposed within said semiconducting sleeve terminates the fault carrying screen; and a sleeve of polymeric insulation is provided on said stripped length of polymeric insulation; said sleeves having the same, or substantially the same, outside diameter.

3. A length of cable as claimed in claim 2, wherein said semiconducting sleeve is provided with an internal counter-bore which receives the end portion of the semiconducting screen in abutting relationship.

4. A length of cable as claimed in claim 3, wherein the internal surface of the semiconducting sleeve flares outwardly from the radial face of the counter-bore to the end of said semiconducting sleeve.

5. A length of cable as claimed in claim 4, wherein said sleeve of polymeric insulation is moulded on said stripped length of polymeric insulation such that a surface of said sleeve of polymeric insulation conforms with said flared internal surface of said semiconducting sleeve.

6. A length of cable as claimed in claim 2 wherein said sleeve of polymeric insulation is moulded on said stripped length of polymeric insulation.

7. A length of cable as claimed in claim 2, wherein the end of the sleeve of polymeric insulation remote from said semiconducting sleeve terminates short of the end face of the cable leaving a protruding length of conductor covered with polymeric insulation.

8. A length of cable as claimed in claim 2, wherein said clamping means has a connecting boss for connecting a bridging braid to the fault carrying screen, which boss is located within an aperture in the semiconducting sleeve.

9. A length of cable as claimed in claim 1, wherein said leading end of the cable is provided with a temporary protective sleeve.

* * * * *

UNITED STATES PATENT AND TRADEMARK OFFICE
CERTIFICATE OF CORRECTION

PATENT NO. : 4,667,063

DATED : May 19, 1987

INVENTOR(S) : Ball

It is certified that error appears in the above-identified patent and that said Letters Patent is hereby corrected as shown below:

Col. 2, line 9, "AT" should read --At--;

line 27, after "sleeve" insert

--13 but does not extend radially outwardly of the sleeve--.

Signed and Sealed this

Twenty-ninth Day of September, 1987

Attest:

DONALD J. QUIGG

*Attesting Officer*    *Commissioner of Patents and Trademarks*